United States Patent
Ghosh et al.

(10) Patent No.: US 9,743,393 B2
(45) Date of Patent: Aug. 22, 2017

(54) DYNAMIC PATTERNED RESOURCE ALLOCATION IN A WIRELESS NETWORK

(71) Applicant: Intel IP Corporation, Santa Clara, CA (US)

(72) Inventors: Chittabrata Ghosh, Fremont, CA (US); Thomas J. Kenney, Portland, OR (US); Shahrnaz Azizi, Cupertino, CA (US); Eldad Perahia, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 57 days.

(21) Appl. No.: 14/750,899

(22) Filed: Jun. 25, 2015

(65) Prior Publication Data

US 2016/0381664 A1 Dec. 29, 2016

(51) Int. Cl.
*H04W 72/04* (2009.01)
*H04L 29/06* (2006.01)

(52) U.S. Cl.
CPC ........... *H04W 72/042* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 2012/0208547 A1* | 8/2012 | Geirhofer | H04B 7/0626 455/452.2 |
| 2014/0024386 A1* | 1/2014 | Novak | H04W 72/082 455/452.1 |
| 2016/0277081 A1* | 9/2016 | Wei | H04B 7/0482 |

* cited by examiner

*Primary Examiner* — Anh Ngoc Nguyen
(74) *Attorney, Agent, or Firm* — Schwegman Lundberg & Woessner, P.A.

(57) ABSTRACT

Devices and techniques for dynamic patterned resource allocation in a wireless network are described herein. Components of a wireless station may obtain a set of dynamic patterns, where members of the set define a sequence of resource units for the wireless network. The components may receive a data unit from an access point of the wireless network, the data unit including a group designation for the wireless station. The components may select one of the set of dynamic patterns based on the received group designation and communicate on the wireless network using resource units specified by the selected dynamic pattern.

20 Claims, 4 Drawing Sheets

DYNAMIC PATTERNED RESOURCE ALLOCATION IN A WIRELESS NETWORK

TECHNICAL FIELD

Embodiments described herein generally relate to wireless communications more specifically to dynamic patterned resource allocation in a wireless network.

BACKGROUND

Orthogonal frequency division multiple access (OFDMA) is a technique whereby a frequency spectrum is divided into relatively narrow band-width sub-channels. In the 802.11 family of standards, OFDMA is proposed to address communications efficiency in dense (e.g., a large number of devices) environments. For example, each wireless station (STA) may be allocated a portion of the channel bandwidth (unlike orthogonal frequency division multiplexing (OFDM) where each STA is allocated the entire channel bandwidth). As noted above, the allocated portion of the channel bandwidth is referred to as a sub-channel and includes a set of OFDM sub-carriers (a type of resource unit).

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In order to allocate resource units to wireless receivers, a coordinator may be used to signal the allocations to the receivers to avoid collisions in resource use. In some examples, these signals may be placed in the physical layer (PHY) preamble. For example, in an 802.11 wireless network, with access points (APs) and STAs, the AP may indicate which resource units to use. The SIG field in the PHY packet data unit (PPDU) (e.g., HE-SIG-B field defined for 802.11ax PPDUs) may be used to signal resource unit allocations to the STAs. Depending on the signaling mechanism used, however, the overhead of such signaling may consume the transmission benefits of OFDMA. For example, if the 11 bit association identifiers (AIDs) assigned to each STA upon associating with an AP are included in every PHY header, in a dense environment, the effective payload of the PPDUs will be greatly reduced.

To address the signaling overhead issues, STAs may maintain a library of dynamic patterned resources and the AP may simply indicate which pattern is assigned to the STA. As used throughout, a dynamic patterned resource is a selection of one or more resources over time. In practice, a dynamic patterned resource may be called a hopping pattern, as the device appears to hop from one resource to another over time.

For example, the dynamic patterned resource library is stored locally at the STA. The library can be subdivided into patterns specific to a group of STAs, designated by a group ID. In an example, the AP indicates resource allocation to STAs by indicating the Group ID and a hopping index for each STA in the group within the HESIG-B of a PPDU. This technique leads to a significant reduction in signaling overhead when compared to other techniques. For example, number of signaling bits used in a HE-SIG-B field of a PPDU for a simple grouping method is 24 bits, assuming 3 bits for resource allocation signaling for a total of 8 users. In this example, the HE-SIG-B field is in the preamble of a high efficiency 802.11communication where the STA is an HE device. The HE-SIG-B field includes information to interpret a HE MU PPDU. However, with the presently disclosed technique of dynamic patterned resource allocation, the overhead may be as little as 3 bits to signal the group position and thus a specific dynamic patterned resource allocation to a STA.

Figure 1:
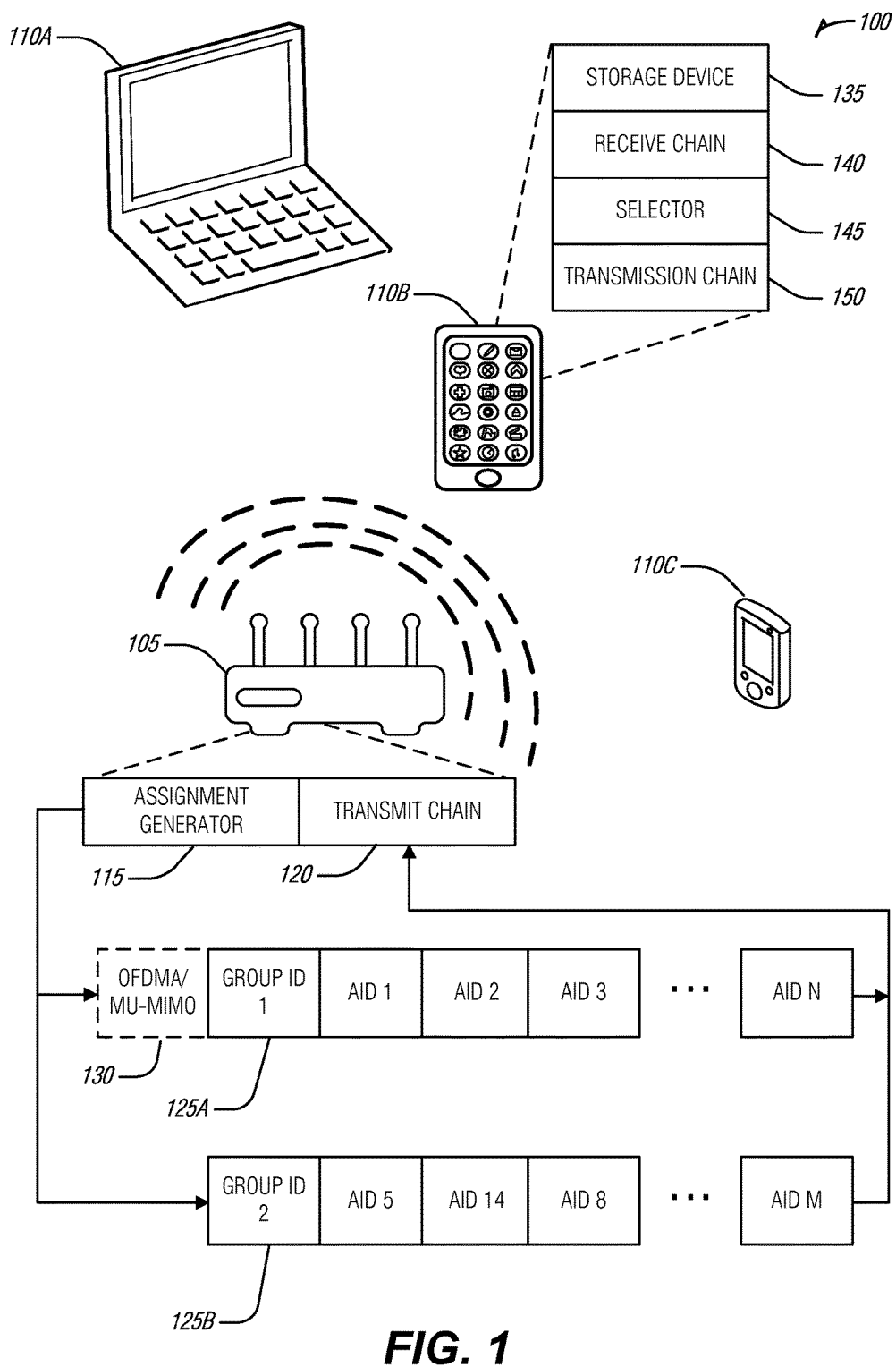
FIG. 1 is a block diagram of an example of an environment including devices for dynamic patterned resource allocation in a wireless network, according to an embodiment.

FIG. 1 is a block diagram of an example of an environment 100 including devices (e.g., AP 105 and STAs 110) for dynamic patterned resource allocation in a wireless network, according to an embodiment. As illustrated, the environment includes STAs 110A, 110B, and 110C in radio communication with the AP 105. STA 110 B is illustrated as having several components 135-150 used for dynamic pattern resource allocation in the wireless network, but each of STAs 110A and 110B also have these components.

The STA 110B includes a storage device 135, a receive chain 140, and a transmission (e.g., transmit) chain 150. In an example, a subset of the STA components includes a storage device accessor arranged to access the storage device 135 (e.g., a bus, memory management unit, etc.). In this way, and apparatus of components that are a subset of STA components give the STA the capabilities described herein. In an example, the STAs 110 are arranged to operate according to an IEEE 802.11 family of standards (e.g., 802.11ac, HEW, etc.). The storage device 135 is arranged to maintain a set of dynamic patterns. Members of the set of dynamic patterns may have a sequence of resource units in time for the wireless network. In an example, the members are also categorized by an index, or other additional argument that allows for greater specificity in a specific member selection by the STA or AP.

In an example, the resource units are OFDMA sub-channels. In an example, the resource units are spatial streams in MIMO or MU-MIMO systems. In an example, a set of dynamic patterns is restricted to one of OFDMA sub-channels or spatial streams. However, a single STA 150 may have multiple sets of dynamic patterns, some of which may govern OFDMA sub-channel allocation and some of which may designate spatial stream allocation for the wireless network.

The receive chain 140 includes radio components arranged to receive or decode radio transmissions from the AP 105. Components can include antennas, filters, and digital components, among others. The receive chain 140 is also arranged to receive a data unit from an access point (AP) of the wireless network. The data unit includes a group designation for the STA.

In an example, the group designation for the STA is in a header (e.g., header 125A) of the data unit. In an example, the data unit is a PPDU in accordance with an IEEE 802.11 family of standards. In an example, the group designation is in a HE-SIG-B field of the PPDU header.

In an example, the data unit includes a field indicating whether the group designation specifies a dynamic pattern of OFDMA resource units or spatial streams, such as optional element 130 of header 125A. In an example, the group designation is indicates a position of the STA within the group. In an example, the group designation takes the form of an array, such as in headers 125A and 125B. As illustrated, the first field of the array is an identification for a group (e.g., group ID). Subsequent fields in the array are association identifications (AIDs) for STAs in the group. In this example, the position in the group corresponds to an index of an AID for the STA in the array. For example, if STA 110C is assigned AID 14 during association, STA 110C's position in the group 2 is also 2 when array indexing starts with 1 on AID 5 in header 125B. Thus, the STA 110C decodes header 125B during association, finds its assigned AID, determines that it is part of group 2, and also determines that it is assigned index 2. In an example, the positions (e.g., indexes in the last example) are limited. In an example, the positions are limited to 64 for group designations of OFDMA resource units. In an example, positions are limited to either STA 110 or AP 105 antennas in spatial stream resource unit group designations. Generally, spatially streams are limited in MIMO systems to the number of antennas of the device with the fewest antennas in an exchange. Thus, the device (whether any STA 110 in the group or the AP 105) with the fewest antennas determines the maximum positions of the group designation.

In an example, the group designation and position are stored in the storage device 135 after association. A subsequent HE-SIG-B field of the PPDU header addressed to the STA 110 to allocate resource units may include only the group designation and a number of resources. In an example, the number of resources is determined by dividing available resources by the number of STAs 110 in the group. In an example, the specifier of OFDMA or MIMO resource units may also be included. Thus, the header may comprise a bit for the specifier, several bits (e.g., 6) for the group ID, and several bits (e.g., 6 bits for 8 STAs) for the number of resources (e.g., index). In this example, the first bit of the header may be the OFDMA/MU-MIMO field, indicating whether the following signaling if for MU-MIMO or OFDMA allocation. For example, if the bit is set to 0, it indicates OFDMA allocation signaling; if the bit is set to 1, MU-MIMO allocation signaling. In an example, when the MUMIMO/OFDMA bit is set to 0, the Group ID field indicates the OFDMA Group ID of the STA 110; if the bit is set to 1, the Group ID field indicates the MU-MIMO Group ID of the STA 110. When the value in the Group ID indicates a specific OFDMA Group ID, the index represents the sequence of resources (e.g., contiguous block of resources) of STAs 110, where each STA 110 starts their respective contiguous allocations in the available resource units at their respective position within the group as originally signaled during association.

The selector 145 is arranged to retrieve one of the set of dynamic patterns based on the group designation. In an example, the selector 145 chooses a member of the set of dynamic patterns using the group designation as a classifier (e.g., key). In examples where the group designation uses an index, the selector 145 may also use the position as an additional classifier. For example, in a database, a specific dynamic pattern may have a multi-key, with one part being the group designation and another part being the position of the STA 110. In an example, the group designation may specify an element in a data structure that contains the dynamic patterns. The position may indicate which of those dynamic patterns is to be used by the STA 110. Accordingly, the selector 145 may be arranged to retrieve a dynamic pattern container that corresponds to the group designation. The selector 145 may then retrieve the dynamic pattern from the dynamic pattern container using the position. An illustrative example of this arrangement is described below with respect to FIG. 2.

The transmission chain 150, like the receive chain 140, includes radio components. In this case, however, the transmission chain 150 is arranged to transmit to the AP 105. The transmission chain 150 is also arranged to communicate on the wireless network using resource units selected by the dynamic pattern.

The AP 105 is arranged to manage the allocations described above. To this end, the AP may include an assignment generator 115 arranged to create group assignments for the plurality of STAs 110. As noted above, these group assignments, and position assignments, may be communicated during association, via a header such as 125A or 125B. The AP 105 may also include a transmit chain 120 to communicate group designation, group position, or any additional signaling to the STAs 110. In an example, the AP 105 is arranged to receive communication from a specific STA (e.g., STA 110B) in accordance with a predetermined dynamic pattern corresponding to the group designation and the position of the STA 110B within the group.

Figure 2:
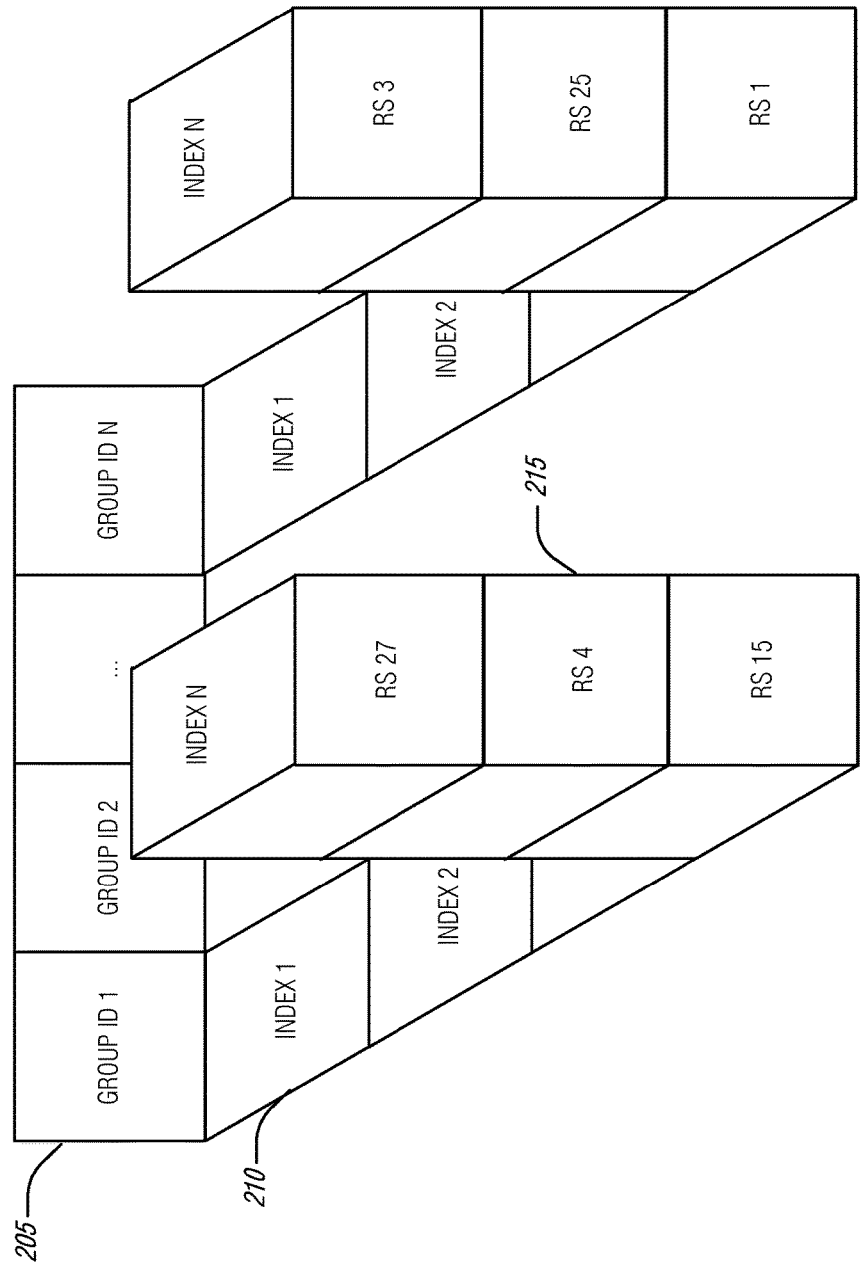
FIG. 2 illustrates an example of a multi-dimensional data structure for a STA to store the dynamic patterned resource allocation, according to an embodiment.

FIG. 2 illustrates an example of a multi-dimensional data structure 200 for a STA to store the dynamic patterned resource allocation, according to an embodiment. The data structure 200 is arranged as a three dimensional array. The first dimension 205 is a group designation. The second dimension 210, only illustrated for GROUP ID 1 and GROUP ID N for clarity, is a STA 110 position in a given group. The third dimension 215 is the specific dynamic pattern of resource units. As illustrated, the resource units in the third dimension 215 are not contiguous; however, in an example they may be contiguous. Thus, for example, given a total resource unit count of 64, the third dimension 215 for INDEX 1 of GROUP ID 1 may include resource units 0-15, INDEX 2 may include resource units 16-31, INDEX 3 may include resource units 32-47, and INDEX 4 may include resource units 48-63. In an example, the index only includes a starting resource unit. Thus, in the previous example of four STAs 110, INDEX 1 may refer to resource unit 0, INDEX 2 to resource unit 16, INDEX 3 to resource unit 32, and INDEX 4 to resource unit 48.

The data structure 200 may be stored by each of the STAs 110 at manufacture, during initial setup, or at any update time period. At association, the STA 110 also stores its group ID and index. Then, a subsequent resource unit allocation by the AP 105 need merely refer to the number of resource units allocated to the STA 110, the question of which specific resources units to fulfill that quota being answered by the data structure, the group designation, and the index. Accordingly, resource unit allocation is efficient and flexible.

Figure 3:
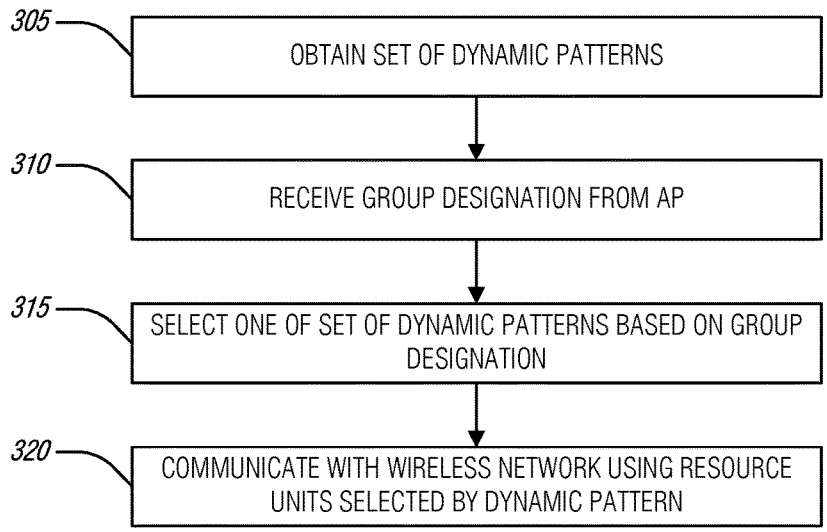
FIG. 3 illustrates an example of a method for a STA to implement dynamic patterned resource allocation in a wireless network, according to an embodiment.

FIG. 3 illustrates an example of a method 300 for a STA to implement dynamic patterned resource allocation in a wireless network, according to an embodiment. The operations of the method 300 are performed by computer hardware components, such as those discussed above with respect to FIG. 1 or below with respect to FIG. 5. In the example of method 300, the operations are performed by a STA.

At operation 305 the STA is obtains a set of dynamic patterns. Members of the set of dynamic patterns are a sequence of resource units in time for the wireless network. In an example, a resource unit is an OFDMA sub-channel. In an example, a resource unit is a MIMO spatial stream.

At operation 310 the STA receives a data unit from an AP of the wireless network. The data unit includes a group designation for the STA. In an example, the group designation is in a header of the data unit. In an example, the data unit is a PPDU arranged in accordance to an IEEE 802.11 family of standards (e.g., 802.11ac, etc.). In an example, the data unit includes a field indicating whether the group designation specifies dynamic patterns of OFDMA sub-channel resource units or spatial stream resource units.

In an example, the group designation indicates a position within the group for the STA. In this example, members of the set of dynamic patterns are housed in one or more dynamic pattern containers in the set of dynamic patterns.

At operation 315 the STA selects one of the set of dynamic patterns based on the group designation. In an example, wherein the group designation includes a group position for the STA and the dynamic patterns are organized in one or more dynamic pattern containers, selecting one of the set of dynamic patterns includes retrieving a dynamic pattern container that corresponds to the group designation and also retrieving the selected dynamic pattern that corresponds to the position from the dynamic pattern container. In an example the group designation and the position may be used as a multi-key to address the specific dynamic pattern specifying resource units that the STA may use.

In an example, the group designation takes the form of an array. In this example, the first field (or other specific field) is a group ID and other fields are AIDs for STAs in the group. In this example, the index of the array of the STA's own AID is the STA's position in the group.

In an example, the number of positions in the group is limited to 64 for groups that specify dynamic patterns of OFDMA resource units. In an example, the number of positions in the group is limited to the number of AP antennas for groups that specify dynamic patterns for downlink spatial stream transmissions. In an example, the number of positions in the group is limited to the number of antennas of a STA in the group that has the fewest antennas for groups that specify dynamic patterns for uplink spatial stream transmissions.

At operation 320 the STA communicates on the wireless network using resource units specified by the dynamic pattern. That is, at any given moment for transmitting or receiving data, the STA looks to the dynamic pattern to determine which of the available resource units the STA can use.

Figure 4:
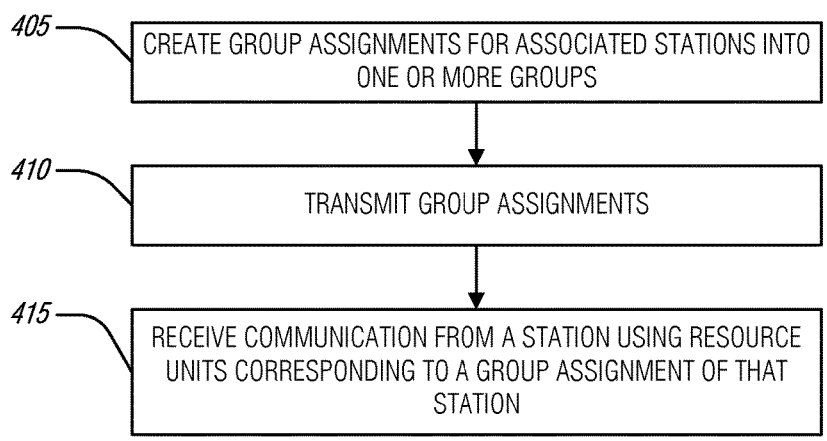
FIG. 4 illustrates an example of a method for an AP to implement dynamic patterned resource allocation in a wireless network, according to an embodiment.

FIG. 4 illustrates an example of a method 400 for an AP to implement dynamic patterned resource allocation in a wireless network, according to an embodiment. The operations of the method 400 are performed by computer hardware components, such as those discussed above with respect to FIG. 1 or below with respect to FIG. 5. In the example of method 400, the operations are performed by an AP.

At operation 405 the AP creates group assignments for a plurality of associated STAs to one or more groups. Each of the one or more groups is associated with a predetermined hopping sequence (e.g., dynamic pattern) of resource units.

The AP may group STAs based on transmission metrics, available resources, or other concerns used to manage the available radio resources. In an example, the resource units are OFDMA sub-channels. In an example, the resource units are MIMO spatial streams. In an example, the predetermined hopping patterns a mutually exclusive as to whether they specify OFDMA sub-channels or MIMO spatial streams. That is, a single pattern or set of patterns specified by a group designation can be one or the other of OFDMA sub-channels or spatial streams. However, in this example, of two sets of hopping patterns corresponding to different group designations, one set may relate to OFDMA sub-channels while the other set may relate to spatial streams.

At operation 410 the group assignments are transmitted. In an example, the AP transmits the group assignments to STAs during STA association with the AP. In an example, the group assignments also include an index of the respective STAs in the group. In an example, the AP may create different hopping pattern sets. These sets may be communicated to the STAs. However, such communication does not occur in PPDU headers, or other signaling overhead mechanisms.

At operation 415 a communication from a STA in the plurality of associated STAs is received in accordance with a predetermined hopping sequence of resource units corresponding to a group assignment for the STA. In an example, the predetermined hopping sequence also corresponds to an index of the STA communication in the group designation. In an example, the group assignment designates a set of hopping patterns and the index designates a specific member of the set of hopping patterns.

Figure 5:
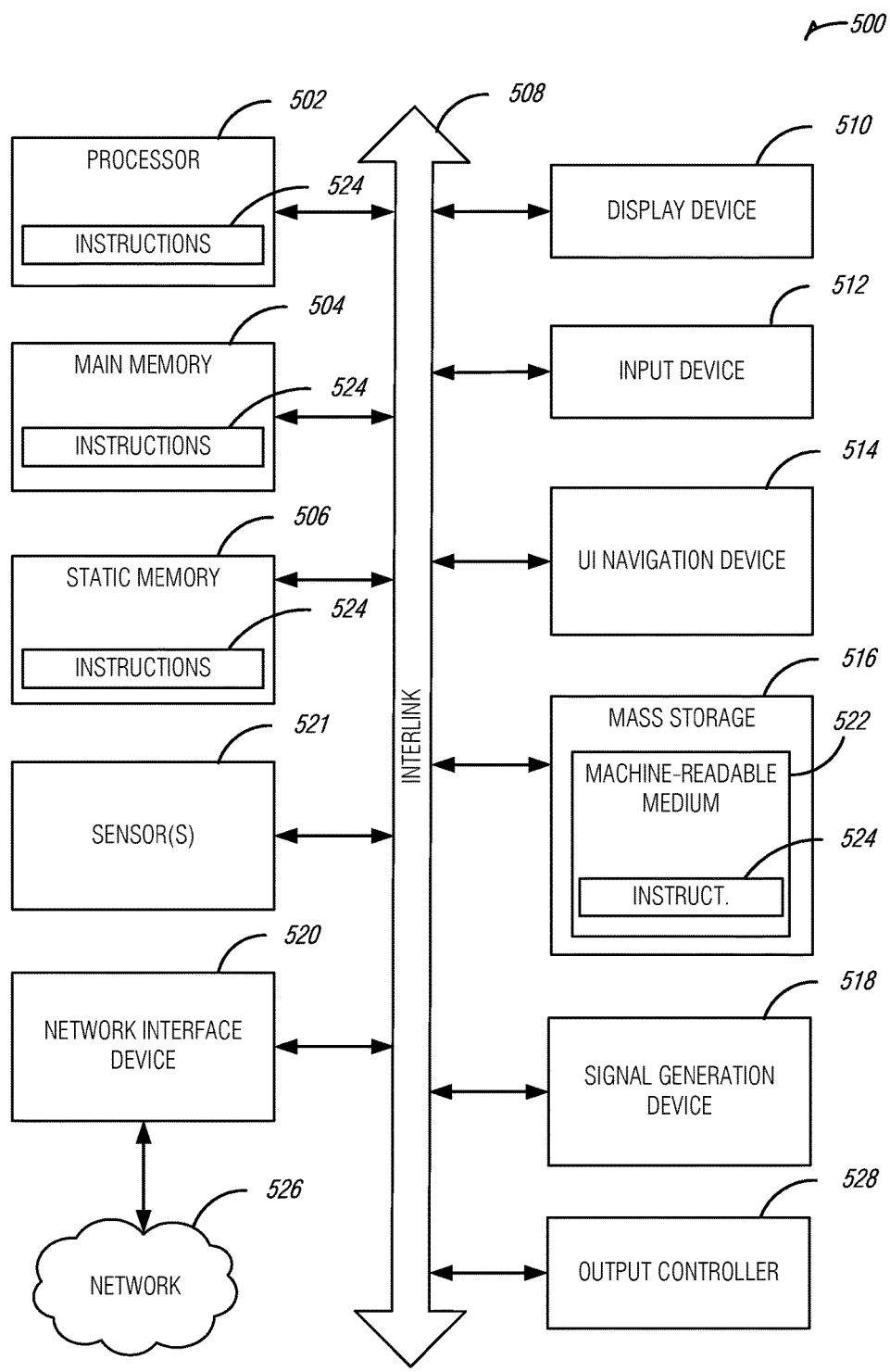
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

ADDITIONAL NOTES & EXAMPLES

Example 1 includes subject matter (such as a device, apparatus, or machine) comprising: a storage device arranged to maintain a set of dynamic patterns, a member of the set of dynamic patterns having a sequence of resource units in time for the wireless network; a receive chain arranged to receive a data unit from an access point (AP) of the wireless network, the data unit including a group designation for the STA; a selector arranged to retrieve one of the set of dynamic patterns based on the group designation; and a transmission chain arranged to communicate on the wireless network using resource units selected by the dynamic pattern.

In Example 2, the subject matter of Example 1 may include, wherein the group designation for the STA is in a header of the data unit.

In Example 3, the subject matter of any one of Examples 1 to 2 may include, wherein the data unit is a physical packet data unit (PPDU) in accordance with an IEEE 802.11 family of standards, and wherein the group designation is in a HE-SIG-B field of the PPDU header.

In Example 4, the subject matter of any one of Examples 1 to 3 may include, wherein the resource unit is an orthogonal frequency division multiple access (OFDMA) sub-channel.

In Example 5, the subject matter of any one of Examples 1 to 4 may include, wherein the resource unit is a spatial stream in a multiple-input multiple-output (MIMO) transmission.

In Example 6, the subject matter of any one of Examples 1 to 5 may include, wherein the data unit includes a field indicating whether the group designation specifies dynamic patterns of orthogonal frequency division multiple access (OFDMA) sub-channel resource units or spatial stream resource units.

In Example 7, the subject matter of any one of Examples 1 to 6 may include, wherein the group designation indicates a position within the group for the STA, wherein members of the set of dynamic patterns are in dynamic pattern containers, and wherein to retrieve one of the set of dynamic patterns based on the group designation includes the selector arranged to: retrieve a dynamic pattern container that corresponds to the group designation; and retrieve the dynamic pattern that corresponds to the position from the dynamic pattern container.

In Example 8, the subject matter of any one of Examples 1 to 7 may include, wherein the group designation takes the form of an array, wherein the first field of the array is an identification for a group, wherein subsequent fields in the array are association identifications (AIDs) for STAs in the group, and wherein the position in the group corresponds to an index of an AID for the STA in the array.

In Example 9, the subject matter of any one of Examples 1 to 8 may include, wherein a number of positions in the group is limited to sixty four for groups that specify dynamic patterns for resource units that are orthogonal frequency division multiple access (OFDMA) sub-channels, and wherein a number of positions in the group is limited a number of AP antennas for downlink transmissions or STA antennas for uplink transmissions on groups that specify dynamic patterns for resource units that are spatial streams.

Example 10 includes subject matter (such as a device, apparatus, or machine) comprising: obtain a set of dynamic patterns, a member of the set of dynamic patterns having a sequence of resource units in time for the wireless network; receive a data unit from an access point (AP) of the wireless network, the data unit including a group designation for the STA; select one of the set of dynamic patterns based on the group designation; and communicate on the wireless network using resource units specified by the dynamic pattern.

In Example 11, the subject matter of Example 1 may include, wherein the group designation for the STA is in a header of the data unit.

In Example 12, the subject matter of any of Examples 10 to 11 may include, wherein the data unit is a physical packet data unit (PPDU) in accordance with an IEEE 802.11 family of standards, and wherein the group designation is in a HE-SIG-B field of the PPDU header.

In Example 13, the subject matter of any one of Examples 10 to 12 may include, wherein a resource unit is an orthogonal frequency division multiple access (OFDMA) sub-channel.

In Example 14, the subject matter of any one of Examples 10 to 13 may include, wherein the resource unit is a spatial stream in a multiple-input multiple-output (MIMO) transmission.

In Example 15, the subject matter of any one of Examples 10 to 14 may include, wherein the data unit includes a field indicating whether the group designation specifies dynamic patterns of orthogonal frequency division multiple access (OFDMA) sub-channel resource units or spatial stream resource units.

In Example 16, the subject matter of any one of Examples 10 to 15 may include, wherein the group designation indicates a position within the group for the STA, wherein members of the set of dynamic patterns are stored in a dynamic pattern container, and wherein to select one of the set of dynamic patterns based on the group designation includes the apparatus configured to receive a dynamic pattern container that corresponds to the group designation and to retrieve the dynamic pattern that corresponds to the position from the dynamic pattern container.

In Example 17, the subject matter of any one of Examples 10 to 16 may include, wherein the group designation takes the form of an array, wherein the first field of the array is an identification for a group, wherein subsequent fields in the array are association identifications (AIDs) for STAs in the group, and wherein the position in the group corresponds to an index of an AID for the STA in the array.

In Example 18, the subject matter of any one of Examples 10 to 17 may include, wherein a number of positions in the group is limited to sixty four for groups that specify dynamic patterns for resource units that are orthogonal frequency division multiple access (OFDMA) sub-channels, and wherein a number of positions in the group is limited a number of AP antennas for downlink transmissions or STA antennas for uplink transmissions on groups that specify dynamic patterns for resource units that are spatial streams.

Example 19 includes subject matter (such as a method, means for performing acts, machine readable medium including instructions that when performed by a machine cause the machine to performs acts, or an apparatus to perform) comprising: obtaining a set of dynamic patterns, a member of the set of dynamic patterns having a sequence of resource units in time for the wireless network; receiving a data unit from an access point (AP) of the wireless network, the data unit including a group designation for the STA; selecting one of the set of dynamic patterns based on the group designation; and communicating on the wireless network using resource units specified by the dynamic pattern.

In Example 20, the subject matter of Example 19 may include, wherein the group designation for the STA is in a header of the data unit.

In Example 21, the subject matter of any one of Examples 19 to 20 may include, wherein the data unit is a physical packet data unit (PPDU) in accordance with an IEEE 802.11 family of standards, and wherein the group designation is in a HE-SIG-B field of the PPDU header.

In Example 22, the subject matter of any one of Examples 19 to 21 may include, wherein a resource unit is an orthogonal frequency division multiple access (OFDMA) sub-channel.

In Example 23, the subject matter of any one of Examples 19 to 22 may include, wherein the resource unit is a spatial stream in a multiple-input multiple-output (MIMO) transmission.

In Example 24, the subject matter of any one of Examples 19 to 23 may include, wherein the data unit includes a field indicating whether the group designation specifies dynamic patterns of orthogonal frequency division multiple access (OFDMA) sub-channel resource units or spatial stream resource units.

In Example 25, the subject matter of any one of Examples 19 to 24 may include, wherein the group designation indicates a position within the group for the STA, wherein members of the set of dynamic patterns are stored in a dynamic pattern container, and wherein selecting one of the set of dynamic patterns based on the group designation includes retrieving a dynamic pattern container that corresponds to the group designation and retrieving the dynamic pattern that corresponds to the position from the dynamic pattern container.

In Example 26, the subject matter of any one of Examples 19 to 25 may include, wherein the group designation takes the form of an array, wherein the first field of the array is an identification for a group, wherein subsequent fields in the array are association identifications (AIDs) for STAs in the group, and wherein the position in the group corresponds to an index of an AID for the STA in the array.

In Example 27, the subject matter of any one of Examples 19 to 26 may include, wherein a number of positions in the group is limited to sixty four for groups that specify dynamic patterns for resource units that are orthogonal frequency division multiple access (OFDMA) sub-channels, and wherein a number of positions in the group is limited a number of AP antennas for downlink transmissions or STA antennas for uplink transmissions on groups that specify dynamic patterns for resource units that are spatial streams.

Example 28 includes subject matter (such as a CRM) comprising: creating group assignments for a plurality of associated wireless stations (STAs) to one or more groups, each of the one or more groups associated with a predetermined hopping sequence of resource units; transmitting the group assignments; and receiving a communication from a STA in the plurality of associated STAs in accordance with a predetermined hopping sequence of resource units corresponding to a group assignment for the STA.

In Example 29, the subject matter of Example 28 may include, wherein the group assignment also includes an index of the STA in the group.

In Example 30, the subject matter of any one of Examples 28 to 29 may include, wherein the group assignment designates a set of hopping patterns, and wherein the index designates a member of the set of hopping patterns.

In Example 31, the subject matter of any one of Examples 28 to 30 may include, wherein the resource units are orthogonal frequency division multiple access (OFDMA) sub-channels.

In Example 32, the subject matter of any one of Examples 28 to 31 may include, wherein the resource units are spatial streams.

Example 33 includes subject matter (such as a method, means for performing acts, machine readable medium including instructions that when performed by a machine cause the machine to performs acts, or an apparatus to perform) comprising: creating group assignments for a plurality of associated wireless stations (STAs) to one or more groups, each of the one or more groups associated with a predetermined hopping sequence of resource units; transmitting the group assignments; and receiving a communication from a STA in the plurality of associated STAs in accordance with a predetermined hopping sequence of resource units corresponding to a group assignment for the STA.

In Example 34, the subject matter of Example 33 may include, wherein the group assignment also includes an index of the STA in the group.

In Example 35, the subject matter of any one of Examples 33 to 34 may include, wherein the group assignment designates a set of hopping patterns, and wherein the index designates a member of the set of hopping patterns.

In Example 36, the subject matter of any one of Examples 33 to 35 may include, wherein the resource units are orthogonal frequency division multiple access (OFDMA) sub-channels.

In Example 37, the subject matter of any one of Examples 33 to 36 may include, wherein the resource units are spatial streams.

Example 38 includes subject matter (such as a device, apparatus, or machine) comprising: an assignment generator to create group assignments for a plurality of associated wireless stations (STAs) to one or more groups, each of the one or more groups associated with a predetermined hopping sequence of resource units; a transmit chain to transmit the group assignments; and a receipt chain to receive a communication from a STA in the plurality of associated STAs in accordance with a predetermined hopping sequence of resource units corresponding to a group assignment for the STA.

In Example 39, the subject matter of Example 38 may include, wherein the group assignment also includes an index of the STA in the group.

In Example 40, the subject matter of any one of Examples 38 to 39 may include, wherein the group assignment designates a set of hopping patterns, and wherein the index designates a member of the set of hopping patterns.

In Example 41, the subject matter of any one of Examples 38 to 40 may include, wherein the resource units are orthogonal frequency division multiple access (OFDMA) sub-channels.

In Example 42, the subject matter of any one of Examples 38 to 41 may include, wherein the resource units are spatial streams.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third,"

etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. An apparatus for a wireless station (STA) to enable dynamic patterned resource allocation in a wireless network, the apparatus comprising:
a storage device accessor arranged to obtain a set of dynamic patterns, a member of the set of dynamic patterns having a sequence of resource units in time for the wireless network;
a receive chain arranged to receive a data unit from an access point (AP) of the wireless network, the data unit including a group designation for the STA;
a selector arranged to retrieve one of the set of dynamic patterns based on the group designation, the selector implemented by a circuit set defined by instructions stored on the apparatus; and
a transmission chain arranged to communicate on the wireless network using resource units selected by the dynamic pattern.

2. The apparatus of 1, wherein the group designation for the STA is in a header of the data unit.

3. The apparatus of claim 2, wherein the data unit is a physical packet data unit (PPDU) in accordance with an IEEE 802.11 family of standards, and wherein the group designation is in a HE-SIG-B field of the PPDU header.

4. The apparatus of claim 1, wherein the resource unit is an orthogonal frequency division multiple access (OFDMA) sub-channel.

5. The apparatus of claim 1, wherein the resource unit is a spatial stream in a multiple-input multiple-output (MIMO) transmission.

6. The apparatus of claim 1, wherein the data unit includes afield indicating whether the group designation specifies dynamic patterns of orthogonal frequency division multiple access (OFDMA) sub-channel resource units or spatial stream resource units.

7. The apparatus of claim 1, wherein the group designation indicates a position within the group for the STA, wherein members of the set of dynamic patterns are in dynamic pattern containers, and wherein to retrieve one of the set of dynamic patterns based on the group designation includes the selector arranged to:
retrieve a dynamic pattern container that corresponds to the group designation; and
retrieve the dynamic pattern that corresponds to the position from the dynamic pattern container.

8. The apparatus of claim 7, wherein the group designation takes the form of an array, wherein the first field of the array is an identification for a group, wherein subsequent fields in the array are association identifications (AIDs) for STAs in the group, and wherein the position in the group corresponds to an index of an AID for the STA in the array.

9. The apparatus of claim 7, wherein a number of positions in the group is limited to sixty four for groups that specify dynamic patterns for resource units that are orthogonal frequency division multiple access (OFDMA) sub-channels, and wherein a number of positions in the group is limited a number of AP antennas for downlink transmissions or STA antennas for uplink transmissions on groups that specify dynamic patterns for resource units that are spatial streams.

10. At least one non-transitory machine readable medium including instructions that, when executed by an apparatus of a wireless station (STA), cause the STA to perform operations for dynamic patterned resource allocation in a wireless network, the operations to configure the apparatus to:
obtain a set of dynamic patterns, a member of the set of dynamic patterns having a sequence of resource units in time for the wireless network;
receive a data unit from an access point (AP) of the wireless network, the data unit including a group designation for the STA;
select one of the set of dynamic patterns based on the group designation; and
communicate on the wireless network using resource units specified by the dynamic pattern.

11. The at least one machine readable medium of claim 10, wherein the data unit is a physical packet data unit (PPDU) in accordance with an IEEE 802.11 family of standards, and wherein the group designation is in a HE-SIG-B field of a PPDU header.

12. The at least one machine readable medium of claim 10, wherein a resource unit is an orthogonal frequency division multiple access (OFDMA) sub-channel.

13. The at least one machine readable medium of claim 10, wherein the group designation indicates a position within the group for the STA, wherein members of the set of dynamic patterns are stored in a dynamic pattern container, and wherein to select one of the set of dynamic patterns based on the group designation includes the apparatus configured to receive a dynamic pattern container that corresponds to the group designation and to retrieve the dynamic pattern that corresponds to the position from the dynamic pattern container.

14. The at least one machine readable medium of claim 13, wherein the group designation takes the form of an array, wherein the first field of the array is an identification for a group, wherein subsequent fields in the array are association identifications (AIDs) for STAs in the group, and wherein the position in the group corresponds to an index of an AID for the STA in the array.

15. The at least one machine readable medium of claim 13, wherein a number of positions in the group is limited to sixty four for groups that specify dynamic patterns for resource units that are orthogonal frequency division multiple access (OFDMA) sub-channels, and wherein a number of positions in the group is limited a number of AP antennas for downlink transmissions or STA antennas for uplink transmissions on groups specify dynamic patterns for resource units that are spatial streams.

16. A method for dynamic patterned resource allocation in a wireless network, the method comprising:

obtaining a set of dynamic patterns, a member of the set of dynamic patterns having a sequence of resource units in time for the wireless network;

receiving a data unit from an access point (AP) of the wireless network, the data unit including a group designation for the STA;

selecting one of the set of dynamic patterns based on the group designation; and communicating on the wireless network using resource units specified by the dynamic pattern.

17. The method of claim 16, wherein the group designation for the STA is in a header of the data unit.

18. The method of claim 17, wherein the data unit is a physical packet data unit (PPDU) in accordance with an IEEE 802.11 family of standards, and wherein the group designation is in a HE-SIG-B field of the PPDU header.

19. The method of claim 16, wherein a resource unit is an orthogonal frequency division multiple access (OFDMA) sub-channel.

20. The method of claim 16, wherein the resource unit is a spatial stream in a multiple-input multiple-output (MIMO) transmission.

* * * * *

UNITED STATES PATENT AND TRADEMARK OFFICE
CERTIFICATE OF CORRECTION

PATENT NO. : 9,743,393 B2
APPLICATION NO. : 14/750899
DATED : August 22, 2017
INVENTOR(S) : Ghosh et al.

Page 1 of 1

It is certified that error appears in the above-identified patent and that said Letters Patent is hereby corrected as shown below:

In the Claims

In Column 14, Line 64, in Claim 15, after "groups", insert --that--

Signed and Sealed this
Fourteenth Day of April, 2020

Andrei Iancu
*Director of the United States Patent and Trademark Office*